(12) United States Patent
Morris et al.

(10) Patent No.: US 6,449,116 B2
(45) Date of Patent: Sep. 10, 2002

(54) COMPRESSION AND STORAGE OF WRITTEN-IN ERROR COMPENSATION TABLES IN AN EMBEDDED SERVO DISC DRIVE

(75) Inventors: John C. Morris; Thomas C. Zirps, both of Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/781,363

(22) Filed: Feb. 12, 2001

Related U.S. Application Data

(63) Continuation of application No. PCT/US01/04478, filed on Feb. 12, 2001.
(60) Provisional application No. 60/202,888, filed on May 10, 2000.

(51) Int. Cl.[7] ............................................. G11B 5/596
(52) U.S. Cl. ................................................... 360/77.04
(58) Field of Search .............................. 360/77.04, 75, 360/78.09, 77.08, 78.04

(56) References Cited

U.S. PATENT DOCUMENTS

| | | | |
|---|---|---|---|
| 5,444,583 A | 8/1995 | Ehrlich et al. ............ | 360/78.09 |
| 5,535,072 A | 7/1996 | Witt et al. ................ | 360/99.06 |
| 5,539,714 A | 7/1996 | Andrews, Jr. et al. ..... | 369/44.26 |
| 5,550,685 A | 8/1996 | Doulin ..................... | 360/77.08 |
| 5,608,586 A | 3/1997 | Sri-Jayantha et al. ..... | 360/77.04 |
| 5,978,169 A | 11/1999 | Woods ..................... | 360/77.04 |
| 6,069,794 A | 5/2000 | Morris et al. ............. | 360/77.04 |
| 6,128,153 A | * 10/2000 | Hasegawa et al. ... | 360/77.08 X |
| 6,310,742 B1 | * 10/2001 | Nazarian et al. .......... | 360/77.04 |

FOREIGN PATENT DOCUMENTS

WO    WO 99/22369    6/1999

OTHER PUBLICATIONS

U.S. patent application Ser. No. 09/370,823, Eddy et al., filed Aug. 1999.
U.S. patent application Ser. No. 09/394,160, Hsin et al., filed Sep. 1999.
U.S. patent application Ser. No. 09/473,622, Abdelnour, filed Dec. 1999.
U.S. patent application Ser. No. 09/481,422, Morris et al., filed Jan. 2000.

* cited by examiner

Primary Examiner—Andrew L. Sniezek
(74) Attorney, Agent, or Firm—Westman, Champlin & Kelly

(57) ABSTRACT

A method and apparatus for compensating for repeatable run-out errors in a disc drive is provided in which transfer function values for a servo loop in the disc drive are first determined. A sequence of repeatable run-out values for a portion of the disc drive is then determined. A transform is applied to the sequence of repeatable run-out values to obtain frequency-domain repeatable run-out values. Each frequency-domain repeatable run-out value is divided by a respective transfer function value to produce a sequence of frequency-domain compensation values which are then stored. An inverse transform is applied to the frequency-domain compensation values to obtain a sequence of time-domain compensation values. The sequence of time-domain compensation values is inserted into the servo loop.

8 Claims, 5 Drawing Sheets

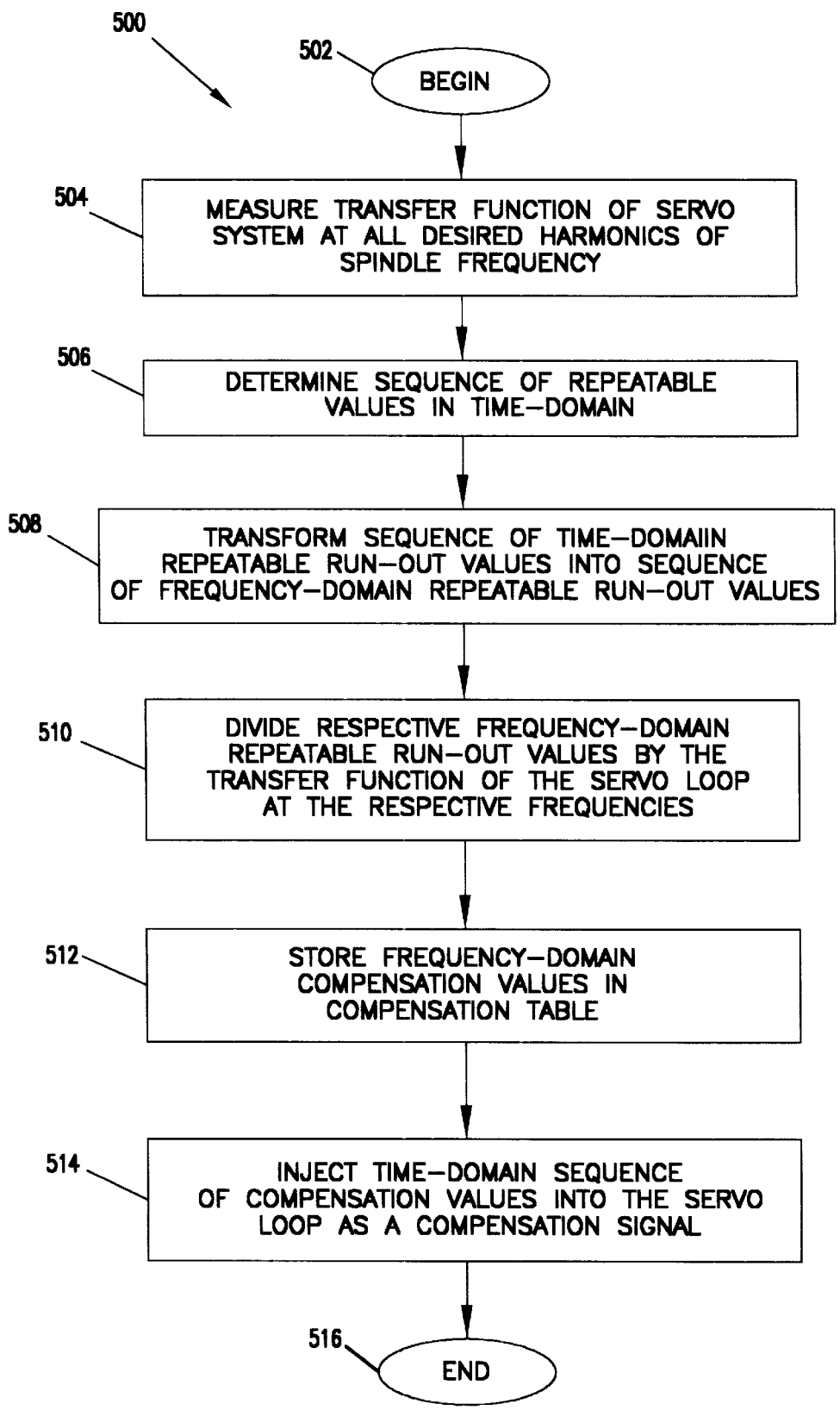

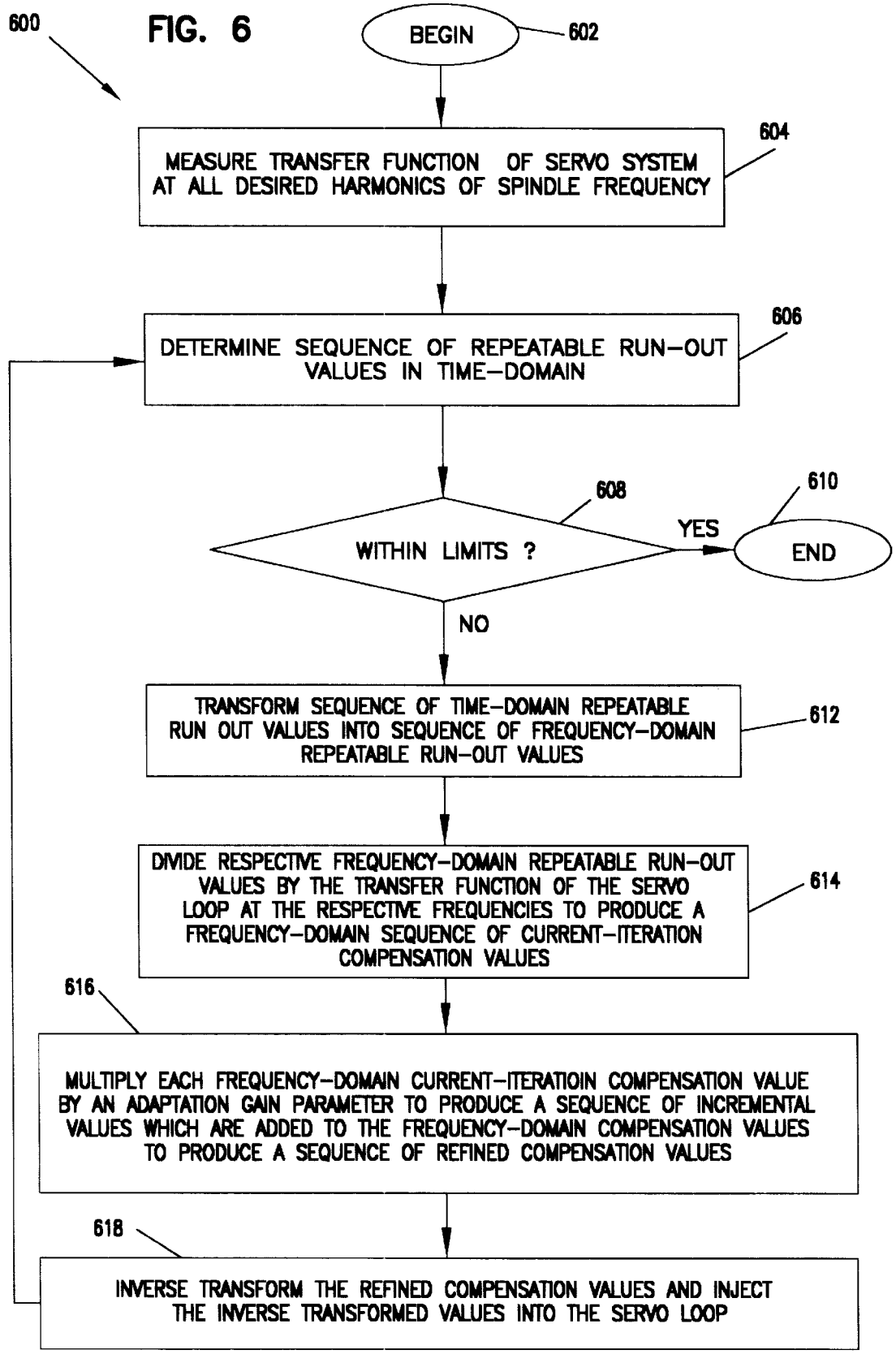

COMPRESSION AND STORAGE OF WRITTEN-IN ERROR COMPENSATION TABLES IN AN EMBEDDED SERVO DISC DRIVE

CROSS-REFERENCE TO RELATED APPLICATION

This application claims priority of U.S. Provisional Application No. 60/202,888 filed May 10, 2000, by John C. Morris and Thomas C. Zirps for "EFFICIENT COMPRESSION AND STORAGE OF ZAP TABLES", and is a continuation of International Application No. PCT/US01/04478, filed Feb. 12, 2001, by Seagate Technology LLC for "COMPRESSION AND STORAGE OF WRITTEN-IN ERROR COMPENSATION TABLES IN AN EMBEDDED SERVO DISC DRIVE", which is published in English and in turn claims priority of the aforementioned U.S. Provisional Application.

FIELD OF THE INVENTION

The present invention relates to servo systems in disc drives. In particular, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high frequency changes in the path defined by the servo fields.

Written-in errors are often referred to as repeatable run-out errors because they cause the same errors each time the head passes along a track. As track densities increase, these repeatable run-out errors begin to limit the track pitch. Specifically, variations between the ideal track path and the actual track path created by the servo fields can result in a track interfering with or squeezing an adjacent track. This is especially acute when a first written-in error causes a head to be outside of an inner track's ideal circular path and a second written-in error causes the head to be inside of an outer track's ideal circular path. To avoid limitations on the track pitch, systems that compensate for repeatable run-out errors are employed.

One existing technique for repeatable run-out error compensation involves storing time-domain compensation values in the form of a compensation table on discs in the disc drive. These compensation values are injected into the servo loop to compensate for repeatable run-out errors. Typically, a time-domain compensation value for each servo sector is required to be stored in the compensation table. The resulting large compensation table needs to be stored on discs in the drive due to the large memory requirement.

The present invention addresses these and other problems, and offers other advantages over the prior art.

SUMMARY OF THE INVENTION

The present system relates to a repeatable run-out error compensation scheme that employs a compression technique that is integral to the compensation algorithm and stores frequency-domain compensation values in the compensation table, thereby addressing the above-mentioned problems.

A method and apparatus for compensating for repeatable run-out errors in a disc drive is provided in which transfer function values for a servo loop in the disc drive are first determined. A sequence of repeatable run-out values for a portion of the disc drive is then determined. A transform is applied to the sequence of repeatable run-out values to obtain frequency-domain repeatable run-out values. Each frequency-domain repeatable run-out value is divided by a respective transfer function value to produce a sequence of frequency-domain compensation values which are then stored. An inverse transform is applied to the frequency-domain compensation values to obtain a sequence of time-domain compensation values. The sequence of time-domain compensation values is inserted into the servo loop.

These and various other features as well as advantages which characterize the present invention will be apparent upon reading of the following detailed description and review of the associated drawings.

BRIEF DESCRIPTION OF THE DRAWINGS

FIG. 5 is a flow diagram of a non-iterative embodiment of the present invention.

FIG. 6 is a flow diagram of an iterative embodiment of the present invention.

DETAILED DESCRIPTION OF ILLUSTRATIVE EMBODIMENTS

Figure 1:
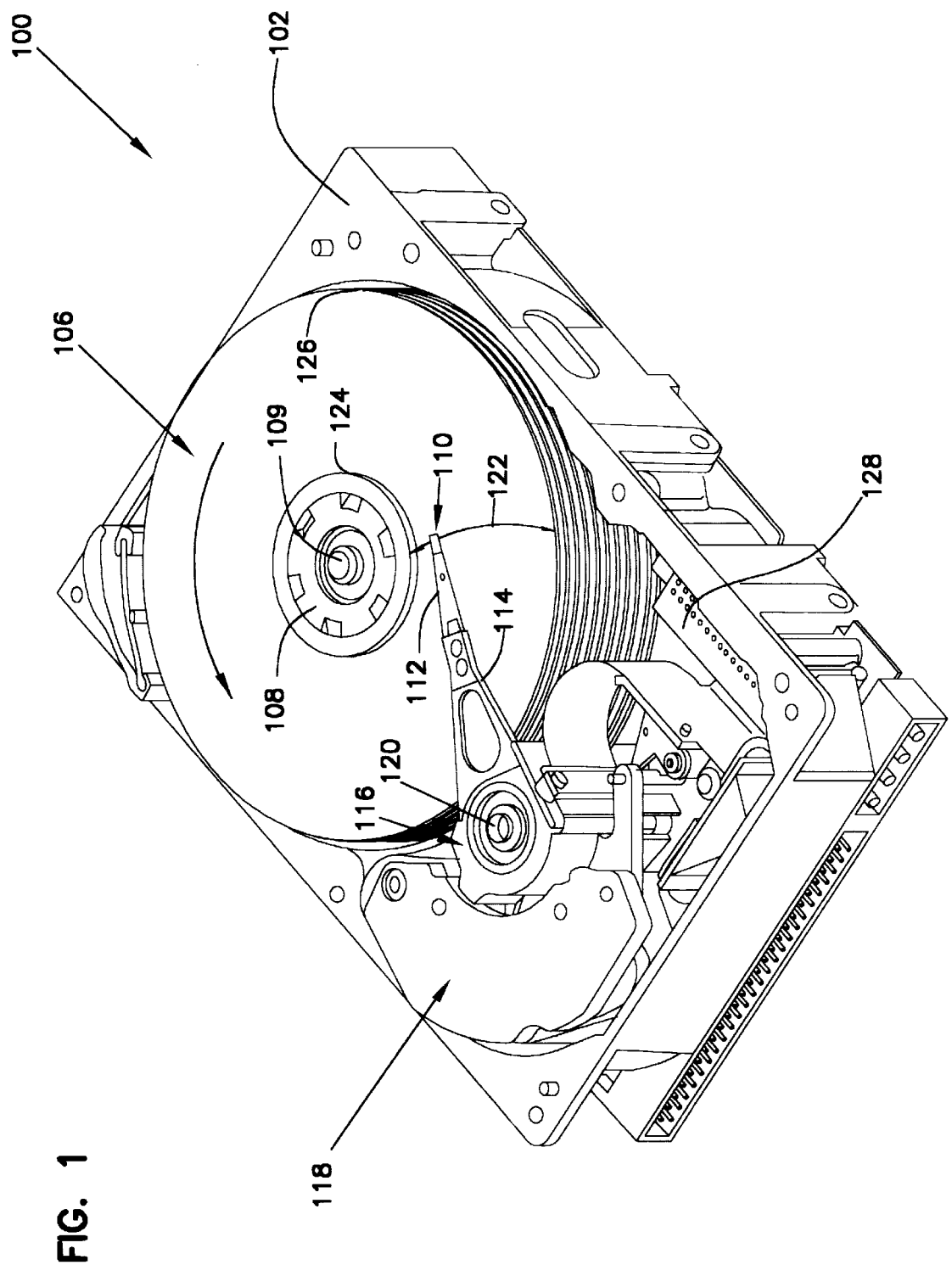
FIG. 1 is a perspective view of a head-disc assembly (HDA) in accordance with the present system.

Referring now to FIG. 1, a perspective view of a magnetic disc drive, head disc assembly (HDA) 100 in accordance with the present invention is shown. The same reference numerals are used in the various figures to represent the same or similar elements. HDA 100 includes a housing with a base 102 and a top cover (not shown). HDA further includes a disc pack 106, which is mounted on a spindle motor (not shown) by a disc clamp 108. Disc pack 106 includes a plurality of individual discs which are mounted for co-rotation about central axis 109.

Each disc surface has an associated slider 110 which is mounted in HDA 100 and carries a read/write head for communication with the disc surface. In the example shown in FIG. 1, sliders 110 are supported by suspensions 112 which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 110 passes over the servo fields, the read/write head generates a readback signal that identifies the location of the head relative to the center line of the desired track. Based on this location, actuator 116 moves suspension 112 to adjust the head's position so that it moves toward the desired position. Once the transducing head is appropriately positioned, servo controller 128 then executes a desired read or write operation.

Figure 2:
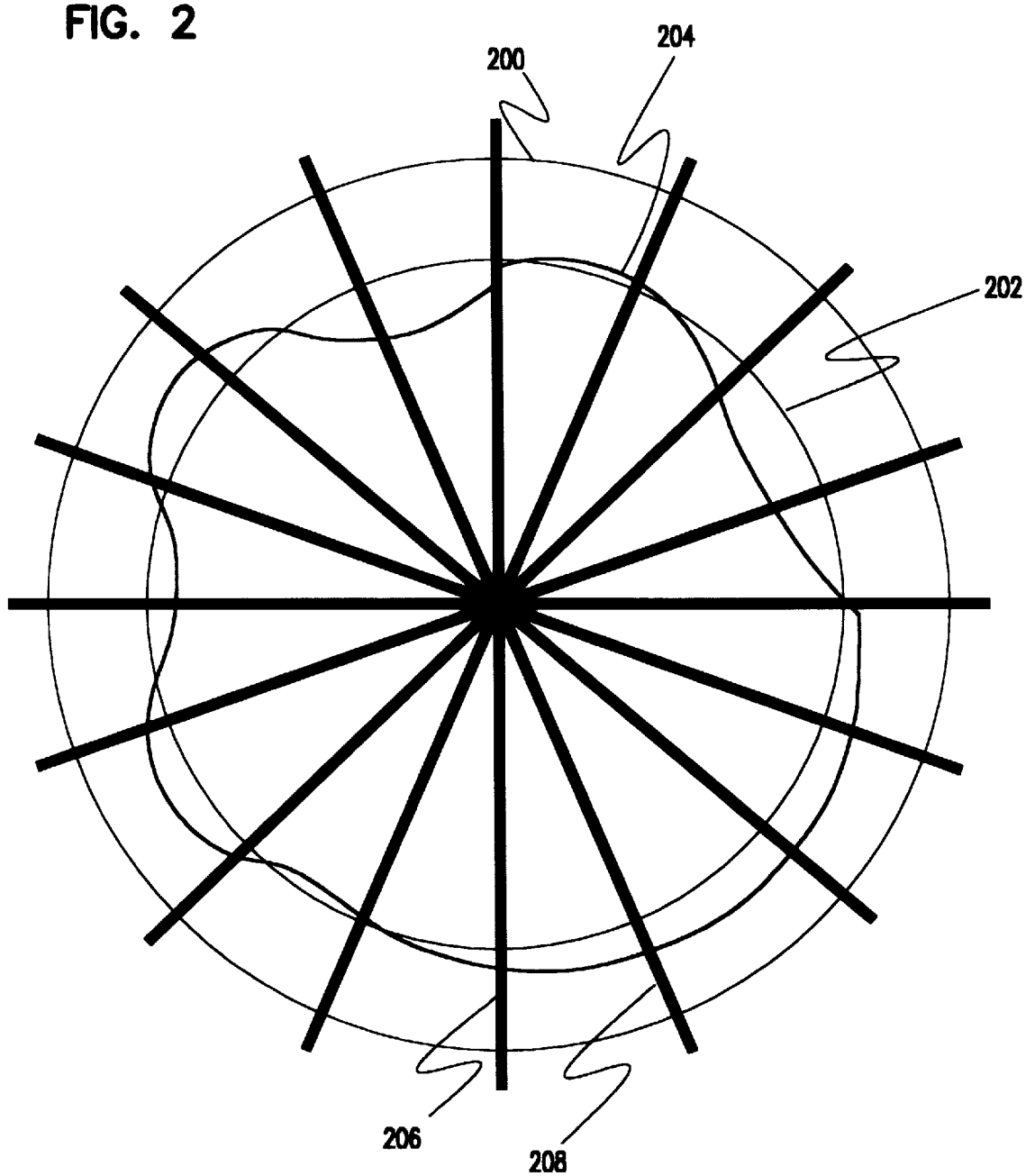
FIG. 2 is a top view of a section of a disc showing an ideal track and a realized written-in track.

Referring now to FIG. 2, a top view of a section 200 of a disc with an ideal, perfectly circular track 202 and an actual track 204 is shown. Section 200 includes a plurality of radially extending servo fields such as servo fields 206 and 208. The servo fields include servo information that identifies the location of actual track 204 along disc section 200.

Any variation in the position of a head away from circular track 202 is considered a position error. The portions of track 204 that do not follow circular track 202 create written-in repeatable run-out position errors. A position error is considered a repeatable run-out error if the same error occurs each time the head passes a particular circumferential location on the disc. Track 204 creates a repeatable run-out error because each time a head follows the servo fields that define track 204, it produces the same position error relative to ideal track 202.

Under the present invention, a head attempting to write to or read from track 204 will not follow track 204 but instead will more closely follow perfectly circular track 202. This is accomplished using a compensation signal that prevents the servo system from tracking repeatable run-out errors resulting from the irregular shape of track 204.

Figure 3:
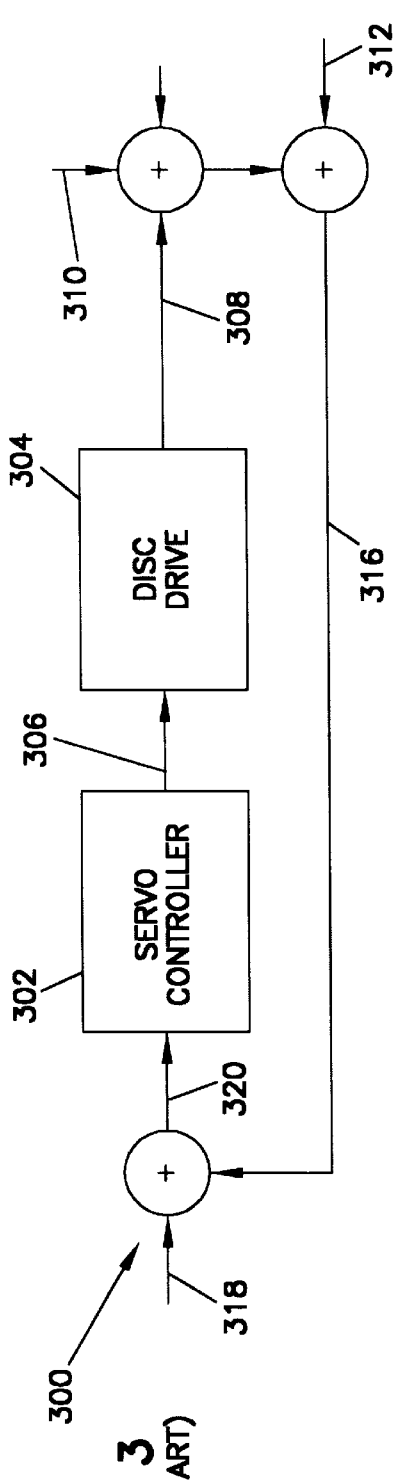
FIG. 3 is a block diagram of a prior art servo loop.

Referring now to FIG. 3, a block diagram of a servo loop 300 of the prior art is shown. The servo loop includes a servo controller 302, having a gain of "K" and a disc drive 304 having a gain of "P". Servo controller 302 is the servo control circuitry within internal circuit 128 of FIG. 1. Disc drive 304 includes actuator assembly 116, voice coil motor 118, track accessing arm 114, suspension 112, and sliders 110, all of FIG. 1.

Servo controller 302 generates a control current 306 that drives the voice coil motor of disc drive 304. In response, disc drive 304 produces head motion 308. In FIG. 3, the written-in error, $d_w$, is represented as a separate input signal 310 even though the written-in error would otherwise appear implicitly in head motion 308. The separation of written-in error 310 from head motion 308 provides a better understanding of the present invention. In addition, noise in the servo system has been separated and appears as noise 312, which is added to the head motion. The sum of head motion 308, written-in error 310 and noise 312 results in the head's servo measurement signal 316. Servo measurement signal 316 is subtracted from a reference signal 318, which is generated by internal circuitry 128 based on a desired location for the head. Subtracting head measurement 316 from reference signal 318 produces position error signal 320 which is input to servo controller 302.

The servo loop of FIG. 3 has a closed loop response that is calculated as:

$$y = \frac{PK}{1+PK}(r - n - d_w) \quad \text{EQ. 1}$$

where "y" is head motion 308, "P" is the gain of disc drive 304, "K" is the gain of servo controller 302, "r" is reference signal 318, "n" is noise signal 312, and "$d_w$" is the written-in error.

From EQ. 1, it is clear that heads in servo loops of the prior art move in response to written-in errors. This movement is undesirable since it places the head outside of the ideally circular track path. Further, because the transfer function, PK/(1+PK), is frequency dependent, the transfer function suffers from peaking at certain frequencies. This peaking causes even greater position errors because it amplifies the written-in error at certain frequencies.

An alternative description of the response of the closed loop system of FIG. 3 is:

$$PES = \frac{1}{1+PK}(r - n - d_w) \quad \text{EQ. 2}$$

where PES is position error signal 320 of FIG. 3. Using EQ. 2, an estimation of $d_w$ can be produced by ignoring reference signal 318 and noise signal 312 and only using the portions of position error signal 320 that are caused by repeatable run-out error. This results in:

$$d_w = -\frac{R}{\frac{1}{(1+PK)}} \quad \text{EQ. 3}$$

where R is the repeatable run-out portion of position error signal 320 as defined in EQ. 13.

Figure 4:
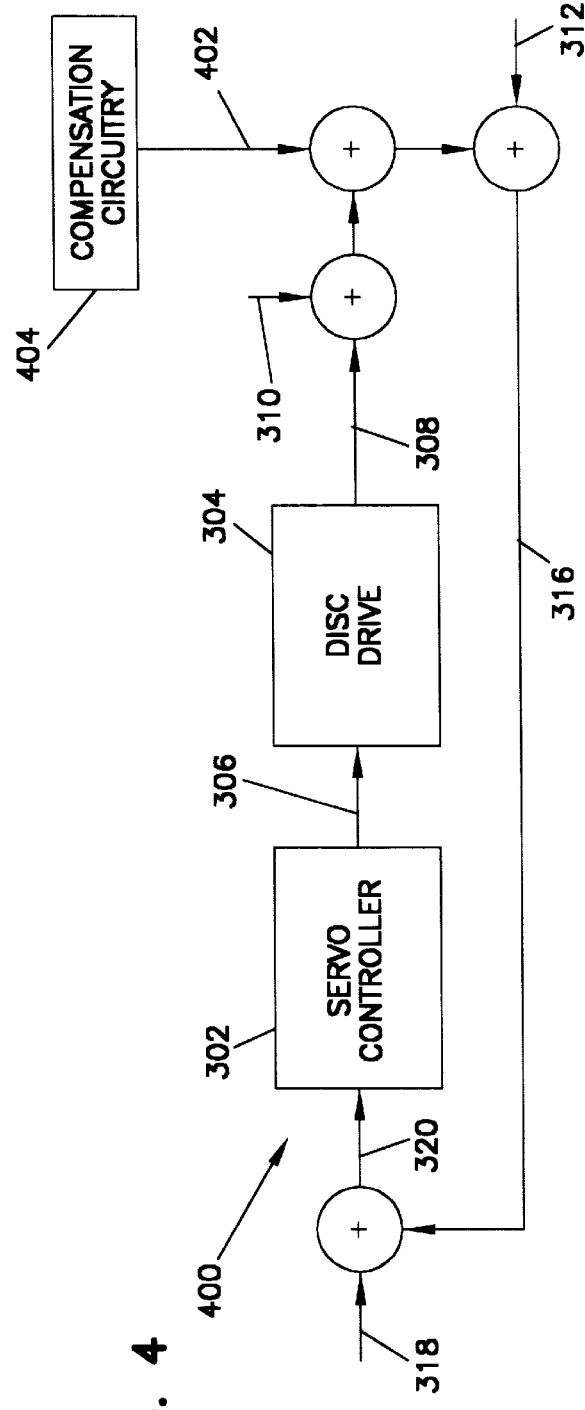
FIG. 4 is a block diagram of a servo loop of the present invention.

To eliminate the unwanted head motion created by the written-in error, the present invention adds a compensation signal to the servo loop of the prior art. This added signal is shown in servo loop 400 of the present invention, which is shown in FIG. 4. In FIG. 4, the elements that are common to FIG. 3 are numbered the same. The compensation signal added to the servo loop is compensation signal 402, which is produced by compensation circuitry 404. In FIG. 4, compensation signal 402 is inserted after the summation of written-in error 310 and head motion 308. However, those skilled in the art will recognize that the compensation signal can be added at other locations within the servo loop.

With the addition of compensation signal 402, the closed loop response of servo loop 400 is expressed as:

$$y = \frac{PK}{1+PK}(r - n - d_w - d_c) \quad \text{EQ. 4}$$

where $d_c$ is compensation signal 402. From EQ. 4, it is apparent that the effects of written-in error, $d_w$, will be eliminated by compensation signal, $d_c$, if the compensation signal is equal to the negative of the written-in error.

Using EQS. 3 and 4 above, an estimation of the compensation signal, $d_c$, needed to eliminate the effects of written-in error, $d_w$, appears as:

$$d_c = \frac{R}{\frac{1}{(1+PK)}} \qquad \text{EQ. 5}$$

where R is the repeatable run-out component of the position error measurement.

In terms of frequencies, EQ. 5 can be described as:

$$dc(j\omega) = \frac{R(j\omega)}{\frac{1}{(1+PK)}(j\omega)} \qquad \text{EQ. 6}$$

The compensation signal injected into the servo loop of the present invention is a time-domain signal. Preferably, this time-domain signal is determined using stored frequency-domain compensation values produced by a modified version of the frequency domain relationship shown in EQ. 6. The stored frequency-domain compensation values are read and transformed into a time-domain compensation signal when the servo system seeks to a specified track.

If disc 200 has N servo sectors (206,208, etc.) on each track, the sample rate $f_s$ is defined as:

$$f_s = 1/T_s = N \cdot RPM/60 \text{ Hz} \qquad (\text{EQ. 7})$$

where $T_s$ is the sample period and RPM is the rotations per minute of the disc. One aspect of the invention includes the recognition that the written-in error is periodic, with a period of $T_s$ which equals $60/(N \cdot RPM)$ seconds. Because the signal is periodic, the spectrum of the written-in error ($d_w$) is uniquely defined by a Fourier series with discrete line spectra:

$$d_w(t) = \sum_{m=-\infty}^{\infty} c_m e^{j\frac{2\pi m}{T_s}t} = c_0 + 2\sum_{m=1}^{\infty} |c_m| \cos\left(\frac{2\pi m}{T_s}t + \phi_M\right) \qquad \text{EQ. 8}$$

where $c_m$ is the Fourier coefficient for each frequency component. With the additional constraint that $d_w$ is discrete-time with N samples, results in the Fourier series consisting of only N harmonically related exponential functions. If the disc drive actuator is moving at frequencies which are above the Nyquist frequency ($f_s/2$ Hz), then these frequencies will be aliased below the Nyquist frequency when written into the disc surface. With this additional constraint, the spectrum of the written-in error, $d_w$ and the written-in correction, $d_c$ can be expressed as:

$$d_w(k) = \sum_{m=0}^{N-1} c_m e^{j\frac{2\pi m}{N}k} \qquad \text{EQ. 9}$$

$$d_c(k) = \sum_{m=0}^{N-1} b_m e^{j\frac{2\pi m}{N}k} \qquad \text{EQ. 10}$$

where $c_m$ are the Fourier coefficients of the written-in error $d_w$, and $b_m$ are the Fourier coefficients of the written-in compensation $d_c$.

Given these constraints an algorithm for estimating the spectrum of written-in repeatable run-out correction, $d_c(j\omega)$, and the resulting time-domain written-in repeatable run-out correction signal, $d_c(k)$, on a specified track and head, with data compression integral to the algorithm can be derived as shown below.

The specialized Discrete Fourier Transform (DFT) and its inverse carrying out calculations over a subset of harmonic frequencies defined on an index set $\Xi$ for a signal x is as follows:

$$x(j\omega) = DFT\{x(k)\}, \qquad \text{EQ. 11}$$
$$= \sum_{k=0}^{N-1} x(k) \times e^{-j\frac{2\pi m}{N}}, \omega = m \cdot (\pi f_{spindle}), m \in \Xi$$

$$x(k) = DFT^{-1}\{x(j\omega)\}, \qquad \text{EQ. 12}$$
$$= \frac{1}{N} \sum_{m \in \Xi} x(j2\pi m f_{spindle}) \times e^{j\frac{2\pi km}{N}}, k = 0, \ldots, N-1$$

where N is the number of servo sectors, k is a specific sector, $f_{spindle}$ is the spindle frequency in Hz and $\Xi$ is an index set of integers drawn from a subset of the integers 1 to $$\frac{N}{2}.$$

This index set defines the frequencies of the written-in error that will be compensated. Because a reduced index set is used, the standard Fast Fourier Transform (FFT) algorithm is not employed, and instead, the specialized DFT is computed using the index set $\Xi$ in EQS. 11 and 12.

Based on EQS. 11 and 12, it can be seen that computation reduces from order $N^2$ to $N\dim(\Xi)$, where $\dim(\Xi)$ is the dimension (or number of elements) of index set $\Xi$. The resulting written-in error compensation algorithm in accordance with the present invention based on the above definitions is shown in FIG. 5.

The method shown in flow diagram 500 begins at state 502 and proceeds to state 504 where the transfer function of the servo system is measured at all desired harmonies of the spindle frequency defined by the index set $\Xi$. The transfer function measured in state 504 is $1/(1+PK)$ ($j\omega$) where $\omega = m \cdot (2\pi f_{spindle})$ and $m \in \Xi$. This transfer function can be measured using known techniques, which are described in "Discrete Time Control" by Franklin, Paul & Workman. Essentially, these techniques inject a disturbance into the servo system and measure a resulting signal within the servo system. The ratio of the injected signal to the measured signal provides the transfer function.

Once the transfer function has been measured, the method continues at state 506 where a time-domain sequence of repeatable run-out values is determined for a track. The repeatable run-out values can be calculated by repeatedly following the track over a number of revolutions, V, and averaging the position error signal obtained at each servo field over all of the revolutions. This is described by the following equation:

$$R(k) = \frac{1}{V} \sum_{i=1}^{V} PES[k + (i-1) \cdot N] \qquad \text{EQ. 13}$$

where R(k) is a sequence of time-domain repeatable run-out values, V is the number of revolutions, N is the number of servo fields along a track, and PES[k+(i−1)N] is the position error signal generated at the $k^{th}$ servo field at each $i^{th}$ revolution.

Thus, at each revolution, the position error signal for each servo field is recorded. The recorded position error signals for a particular servo field are then summed together and divided by the number of revolutions. This is repeated for each servo field resulting in a sequence of repeatable run-out values comprising one repeatable run-out error for each servo field. This sequence of repeatable run-out values is represented by R(k).

After state 506, the method continues at state 508, where the sequence of time-domain repeatable run-out values created in state 506 is transformed into a sequence of frequency-domain repeatable run-out values, R(jω). Preferably, the time-domain sequence of repeatable run-out values is transformed using the specialized DFT at those frequencies defined by the index set Ξ:

$$R(j\omega)=DFT\{R(k)\}, \omega=m\cdot(2\pi f_{spindle}), m\in\Xi \qquad (EQ. 14)$$

In state 510, the respective frequency-domain repeatable run-out values are divided by the value of the servo loop's transfer function at the respective frequencies. This process is described by the equation.

$$d_c(j\omega) = \frac{R(j\omega)}{\frac{1}{1+PK}(j\omega)}, \omega = m\cdot(2\pi f_{spindle}), m\in\Xi \qquad EQ.\ 15$$

Once the frequency-domain compensation values have been produced in state 510, the method continues in state 512 where frequency-domain compensation values are stored in a compensation table. The compensation values are preferably stored in a non-volatile memory and not on disc surfaces. At state 514, a time-domain sequence of compensation values is injected into the servo loop as a compensation signal. The time-domain compensation sequence is obtained by first reading the frequency-domain compensation values from memory and then computing the inverse transform. This is described by the following equation:

$$d_c(k)=DFT^{-1}\{d_c(j\omega)\}, \omega m\cdot(2\pi f_{spindle}), m\in\Xi \qquad (EQ.\ 16)$$

EQ. 16 is implemented by compensation circuit 404 (of FIG. 4) immediately before the servo system seeks a specified track. Compensation circuit 404 first reads the frequency domain compensation values from memory, computes the inverse transform, and then has the complete time domain compensation table ready and available during the track seek operation. The method ends at state 516.

Except for the step of measuring the transfer function of the servo system, the method described in FIG. 5 is preferably repeated for each track on the disc. The transfer function of the servo system may be measured as little as once for the method or may be measured at an inner track, a middle track and an outer track. If more than one transfer function is measured, the transfer function associated with a track that is closest to the track currently being examined is used in the computations of the compensation values for the track. In addition, a separate transfer function may be measured for each head.

The quality of the compensation value produced through the method of FIG. 5 is dependent upon the number of revolutions used to determine the repeatable run-out values in state 506. As the number of revolutions increases, the accuracy of the repeatable run-out values improves. However, each revolution increases the time required to build the disc drive and thus should be minimized if possible. Preferably, the number of revolutions should be kept at five or fewer revolutions per track.

To accommodate a lower number of revolutions, one embodiment of the present invention utilizes an iterative process. Such an iterative process is shown in FIG. 6. The flow diagram 600 of FIG. 6 starts at state 602 and continues at state 604 where the transfer function measured is 1/(1+ PK) (jω) where ω=m·(2πf$_{spindle}$) and m∈Ξ.

A time-domain sequence of repeatable run-out values is then determined in state 606 using EQ. 13 above. Preferably the number of revolutions used to determine the repeatable run-out values is equal to five.

In state 608, the repeatable run-out values are compared against a limit for repeatable run-out values and if the repeatable run-out values are below the limit, the process ends at state 610.

If the time-domain repeatable run-out values are above the desired limits for the disc drive, they are transformed into a sequence of frequency-domain repeatable run-out values in state 612 using EQ. 14 above.

In state 614, each of the frequency-domain repeatable run-out values is divided by the values of the transfer function at the frequencies of the respective run-out values. These divisions produce a sequence of frequency-domain current-iteration compensation values. The process is described by the equation:

$$\delta_c^i(j\omega) = \frac{R(j\omega)}{\frac{1}{1+PK}(j\omega)}, \omega = m\cdot(2\pi f_{spindle}), m\in\Xi \qquad EQ.\ 17$$

where the value of i indicates the current iteration.

In state 616, each frequency-domain current-iteration compensation value is multiplied by an adaptation gain parameter to produce a sequence of incremental values. The incremental values represent changes to be made to the compensation values currently being used by the servo loop. The frequency-domain compensation values are added to the incremental values to produce a sequence of refined compensation values that are stored in the compensation table. This process is described by the equation:

$$d_c^i(j\omega)=d_c^{i-1}(j\omega)+\Phi\times\delta_c^i(j\omega), \omega=m\cdot(2\pi f_{spindle}), m\in\Xi \qquad (EQ.\ 18)$$

where Φ is a written-in repeatable run-out adaptation gain parameter, 0<Φ≦1. Note that Φ can be a frequency-dependent parameter so long as ||Φ||≦1.

On the first pass through the iteration of FIG. 6 the current compensation value at each servo field is equal to zero (when i=1, $d_c^{i-1}(k)=d_c^0(k)=0$).

Since the adaptation gain parameter discussed in state 616 typically has a value between zero and one, only a fraction of the derived compensation value is used to adjust the compensation value used by the servo loop. This causes the servo loop's compensation value to increase in a controlled manner until it reaches the value that provides repeatable run-out values within the limits set within state 608.

In state 618, the new compensation values created in state 616 are inverse transformed and injected into the servo loop as a compensation signal and control is returned to state 606. The inverse transformation process is described by the equation:

$$d_c^i(k)=DFT^{-1}\{d_c^i(j\omega)\}, \omega=m\cdot(2\pi f_{spindle}), m\in\Xi \qquad (EA.\ 19)$$

Steps 606, 608, 612, 614, 616 and 618 repeat such that the compensation values grow until they reach values that cause the repeatable run-out values to be within the limits set by state 608. The final compensation values are stored as real and complex coefficients in the frequency domain in a non-volatile memory.

For a disc with N servo sectors employing the run-out compensation technique of the present invention, the compression obtained is $2 \cdot \dim(\Xi)/N$. Adequate compensation can be achieved with $\dim(\Xi) \leq 10$. Thus, in one example with N=224 servo sectors, the compression attained is $2 \times 10/224 \approx 0.1$. As a result of the significant reduction in the number of compensation values with this technique, the compensation values need not be stored on disc surfaces and could instead be stored in non-volatile memory. In contrast, prior art techniques using stored time-domain compensation values utilize 1–2% of the disc capacity to store the compensation table. In addition to consuming disc space, there are problems associated with reading compensation values from or writing compensation values to disc surfaces resulting from errors preventing the head from following an ideal path.

Since data compression is integral to the algorithm used to calculate compensation values in accordance with the present invention, the process of determining repeatable run out compensation values is substantially faster than in prior art techniques.

In summary, a method of compensating for repeatable run-out errors in a disc drive storage system includes a state 504 of determining transfer function values for a servo loop in the disc drive and 506 of determining a sequence of repeatable run-out values for a portion of the disc drive. In state 508, a transform is applied to the sequence of repeatable run-out values to obtain frequency-domain repeatable run-out values. At state 510, each frequency-domain repeatable run-out value is divided by a respective transfer function value to produce a sequence of frequency-domain compensation values. In state 512, frequency-domain compensation values produced in state 510 are stored. In state 514, an inverse transform is applied to the frequency domain compensation values to obtain a sequence of time-domain compensation values and the sequence of time-domain compensation values is injected into the servo loop.

In further embodiments of the present invention, compensated repeatable run-out values are determined in state 606 after injecting time-domain compensation values into the servo loop. In state 612, a transform is applied to the compensated repeatable run-out values to obtain frequency-domain compensated repeatable run-out values. In state 614, frequency-domain compensated repeatable run-out values are divided by respective transfer function values to produce frequency-domain current-iteration compensation values. These frequency-domain current-iteration compensation values are arithmetically combined with frequency-domain compensation values in state 616 to form refined frequency-domain compensation values. An inverse transform is applied to the refined frequency-domain compensation values in state 618.

In a disc storage system 304 of the present invention a servo loop 400 includes a servo controller 302, actuator 116, a head 110 and a sensor located in the head. The servo loop 400 of the present invention also includes a compensation circuit 404 for injecting a compensation signal 402, where the compensation signal is formed by determining a sequence of repeatable run-out values in a state 506, transforming the sequence of repeatable run-out values into a sequence of frequency-domain repeatable run-out values in a state 508 and dividing each frequency domain repeatable run-out value by a respective transfer function value of the servo loop in a state 510. This produces a sequence of frequency-domain compensation values that are stored in a compensation table in a state 512. The frequency-domain compensation values are inverse transformed to obtain time-domain compensation values that are used to create the compensation signal 402.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed For example, the particular elements may vary depending on the particular application for the servo system while maintaining substantially the same functionality without departing from the scope and spirit of the present invention. In addition, although the preferred embodiment described herein is directed to a servo loop for a disc drive system, it will be appreciated by those skilled in the art that the teachings of the present invention can be applied to other systems, without departing from the scope and spirit of the present invention.

What is claimed is:

1. A method of compensating for repeatable run-out errors in a disc drive, the method comprising:
   (a) determining transfer function values for a servo loop in the disc drive;
   (b) determining a sequence of repeatable run-out values for a portion of the disc drive;
   (c) applying a transform to the sequence of repeatable run-out values to obtain frequency-domain repeatable run-out values;
   (d) dividing each frequency-domain repeatable run-out value by a respective transfer function value to produce frequency-domain compensation values;
   (e) storing the frequency-domain compensation values produced in step (d);
   (f) applying an inverse transform to the frequency-domain compensation values to obtain a sequence of time-domain compensation values; and
   (g) injecting the sequence of time-domain compensation values into the servo loop.

2. The method of claim 1, wherein respective frequencies of the transfer function values of step (a), the frequency-domain compensation values of step (d) and the inverse transform of the frequency-domain compensation values step (f) represent a subset of harmonic frequencies of a spindle motor rotational frequency between the spindle motor rotational frequency and one-half of a number of servo fields around a disc times the spindle motor rotational frequency.

3. The method of claim 1, wherein step (c) is carried out by applying a specialized Discrete Fourier Transform to the sequence of repeatable run-out values, and step (f) is carried out by applying a specialized inverse Discrete Fourier Transform to the frequency domain compensation values, wherein the specialized Discrete Fourier Transform and the specialized inverse Discrete Fourier Transform carry out calculations only over a subset of harmonic frequencies of a spindle motor rotational frequency between the spindle motor rotational frequency and one-half of a number of servo fields around a disc times the spindle motor rotational frequency.

4. The method of claim 1, further comprising:
   (h) determining a sequence of compensated repeatable run-out values after injecting the time-domain compensation values according to step (g);

(i) if a compensated repeatable run-out value exceeds an acceptable repeatable run-out limit, then computing refined frequency-domain compensation values through:
  (1) applying a transform to the compensated repeatable run-out values to obtain frequency-domain compensated repeatable run-out values;
  (2) dividing the frequency-domain compensated repeatable run-out values by the respective transfer function values to produce a sequence of frequency-domain current-iteration compensation values;
  (3) arithmetically combining the frequency-domain current-iteration compensation values with the frequency-domain compensation values to produce refined frequency-domain compensation values;
  (4) applying an inverse transform to the refined frequency-domain compensation values to obtain refined time-domain compensation values;
  (5) injecting the refined time-domain compensation values into the servo loop;
  (6) determining a sequence of refined compensated repeatable run-out values; and
  (7) replacing the frequency-domain compensation values with the refined frequency-domain compensation values if the refined compensated repeatable run-out values are less than the compensated repeatable run-out values.

5. The method of claim 4, wherein the arithmetically combining step (i)(3) comprises multiplying each element of the frequency-domain current-iteration compensation values by a frequency-dependant adaptation gain parameter to produce incremental values, and respectively adding the incremental values to the frequency-domain compensation values.

6. The method of claim 4, further comprising repeating steps (f), (g), (h) and (i) iteratively with each iteration using refined frequency-domain compensation values of an immediately previous iteration until none of the compensated repeatable run-out values exceed an acceptable repeatable run-out limit.

7. A disc storage system having a servo loop for positioning a head over a disc, the servo loop comprising:
  a servo controller which generates a servo control signal in response to a received position error signal;
  an actuator, coupled to the servo controller, which is capable of moving the head in response to the servo control signal;
  a sensor, located in the head, which is capable of sensing servo information located on the disc and producing a servo signal therefrom, the servo signal being combined with a reference signal to produce the position error signal; and
  a compensation circuit for injecting a compensation signal comprised of time-domain compensation values into the servo loop, the compensation circuit comprising a storage device that stores frequency-domain compensation values which are inverse transformed to obtain time-domain compensation values, the frequency-domain compensation values being formed by:
  determining a sequence of repeatable run-out values;
  transforming the sequence of repeatable run-out values into frequency-domain repeatable run-out values; and
  dividing each of the frequency-domain repeatable run-out values by respective values of a transfer function of the servo loop at respective frequencies of the frequency-domain repeatable run-out values to produce a sequence of frequency-domain compensation values.

8. The disc storage system of claim 7, wherein the compensation circuit is further adapted to substitute the frequency-domain compensation values with refined frequency-domain compensation values by:
  inverse transforming the sequence of frequency-domain compensation values into a sequence of time-domain values;
  injecting the sequence of time-domain compensation values into the servo loop;
  determining a sequence of compensated repeatable run-out values while the time-domain compensation values are injected into the servo loop;
  transforming the sequence of compensated repeatable run-out values into frequency-domain compensated repeatable run-out values;
  dividing each of the frequency-domain compensated repeatable run-out values by respective values of a transfer function of the servo loop to produce a sequence of frequency-domain current-iteration compensation values;
  multiplying each of the frequency-domain current-iteration compensation values by an adaptation gain parameter to produce incremental values;
  adding the incremental values to the frequency-domain compensation values to obtain refined frequency-domain compensation values; and
  replacing the frequency-domain compensation values with the refined frequency-domain compensation values in the compensation circuit.

\* \* \* \* \*

UNITED STATES PATENT AND TRADEMARK OFFICE
CERTIFICATE OF CORRECTION

PATENT NO.    : 6,449,116 B2
DATED         : September 10, 2002
INVENTOR(S)   : Morris et al.

It is certified that error appears in the above-identified patent and that said Letters Patent is hereby corrected as shown below:

Title page,
Item [56], References Cited, U.S. PATENT DOCUMENTS, please change "5,550,685 Doulin" to -- Drouin --.

Column 6,
Lines 10-12, change

" $x(j\omega) = DFT\{x(k)\}$, $$= \sum_{k=0}^{N-1} x(k) \times e^{-j\frac{2\pi m}{N}}, \omega = m \cdot (\pi f_{spindle}), m \in \Xi$$ "

to

-- $x(j\omega) = DFT\{x(k)\}$, $$= \sum_{k=0}^{N-1} x(k) \times e^{-j\frac{2\pi km}{N}}, \omega = m \ (\pi f_{spindle}), m \in \Xi$$ --.

Column 8,
Line 61, change "(EA. 19)" to -- (EQ. 19) --.

Signed and Sealed this

Twenty-seventh Day of May, 2003

JAMES E. ROGAN
*Director of the United States Patent and Trademark Office*